United States Patent
Meyer et al.

(10) Patent No.: US 6,667,016 B1
(45) Date of Patent: Dec. 23, 2003

(54) INORGANIC-ORGANIC HYBRID GELS FOR EXTRACTING SPECIES SUCH AS LANTHANIDES AND ACTINIDES, AND THEIR PREPARATION

(75) Inventors: Daniel Meyer, St Génier de Comolas (FR); OLivier Conocar, Angles (FR); Joël Moreau, Montpellier (FR); Michel Wong Chi Man, Vendargues (FR)

(73) Assignee: Commissariat a l'Energie Atomique and Compagnie Generale des Matieres Nucleaires, Velizy Villascoublay (FR)

( * ) Notice: Subject to any disclaimer, the term of this patent is extended or adjusted under 35 U.S.C. 154(b) by 0 days.

(21) Appl. No.: 09/530,133
(22) PCT Filed: Oct. 28, 1998
(86) PCT No.: PCT/FR99/02309
§ 371 (c)(1),
(2), (4) Date: Oct. 6, 2000
(87) PCT Pub. No.: WO99/21654
PCT Pub. Date: May 6, 1999

(30) Foreign Application Priority Data

Oct. 29, 1997 (FR) .............................. 97 13565

(51) Int. Cl.$^7$ .................. C01G 56/00; C01F 17/00
(52) U.S. Cl. ................. 423/6; 423/21.5; 210/681; 210/682
(58) Field of Search ............... 423/6, 7, 21.5, 423/338; 210/679, 681, 682, 688

(56) References Cited

U.S. PATENT DOCUMENTS

| 4,017,528 A | * | 4/1977 | Unger et al. |
| 4,203,952 A | | 5/1980 | Hancock et al. |
| 4,278,803 A | | 7/1981 | Haas et al. |
| 4,448,694 A | | 5/1984 | Plueddemann |
| 4,775,520 A | | 10/1988 | Unger et al. |
| 4,943,375 A | * | 7/1990 | Bradshaw et al. |
| 5,039,419 A | * | 8/1991 | Bradshaw et al. |
| 5,071,819 A | * | 12/1991 | Tarbet et al. |
| 5,078,978 A | * | 1/1992 | Tarbet et al. |
| 5,084,430 A | * | 1/1992 | Tarbet et al. |
| 5,231,156 A | * | 7/1993 | Lin |
| 5,538,931 A | | 7/1996 | Heinrichs et al. |
| 5,637,135 A | | 6/1997 | Ottenstein et al. |
| 5,668,079 A | * | 9/1997 | Tavlarides et al. |

FOREIGN PATENT DOCUMENTS

| EP | 0269447 A2 | 6/1988 |
| EP | 0619141 A1 | 10/1994 |
| FR | 2251594 | 11/1974 |
| GB | 956276 | 4/1964 |
| JP | 3-170529 | 7/1991 |
| WO | WO96/11478 | 4/1996 |

OTHER PUBLICATIONS

Pietrelli et al., "Sorption of Europium and Actinides By Means of Octyl(Phenyl)–N,N–Diisobutyl Carbomoylmethyl Phosphine Oxide (CMPO) Loaded On Silica," Journal of Radioanalytical and Nuclear Chemistry, vol. 141 (1990) pp. 107–115, No Month.

* cited by examiner

*Primary Examiner*—Steven Bos
(74) *Attorney, Agent, or Firm*—Burns, Doane, Swecker & Mathis, L.L.P.

(57) ABSTRACT

Inorganic-organic hybrid gels can be employed to extract chemical species such as lanthanides and actinides and their preparation.

The gels include a network of inorganic components with the formula:

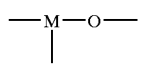

where M is Si, Ti, Zr or Al, wherein organic molecules which can complex the species to be extracted are integrated, with each organic molecule being covalently linked to one or several M atoms in the network. The network is made by a sol-gel process from metallic alkoxides functionalized with complexing groups (amino, ether, hydroxy, amido, pyridino and bipyridino), capable of extracting metals such as lanthanides and actinides.

10 Claims, 2 Drawing Sheets

INORGANIC-ORGANIC HYBRID GELS FOR EXTRACTING SPECIES SUCH AS LANTHANIDES AND ACTINIDES, AND THEIR PREPARATION

FIELD OF THE INVENTION

This invention concerns inorganic-organic hybrid gels for extraction of chemical species from aqueous solutions.

It is applied in particular to extraction of chemical species composed of either metallic cations such as actinides, lanthanides and transition metals, or anions such as nitrates and sulphates.

It can thus be used in various areas, particularly nuclear, for example for extracting actinides from effluents such as the extracts from processing of irradiated fuels, or to decontaminate radioactive effluents, as well as in the environmental area, for example for depollution of water containing heavy metals or other harmful chemical species.

STATE OF THE PRIOR ART

The processes for extraction of chemical species from aqueous solutions include a large number of solid-liquid processes which use various solid phases such as organic or inorganic resins for extraction through ion exchange, and inorganic or organic supports to which a compound is attached, by grafting or impregnation for example, which has a particular affinity for the chemical species to be extracted.

The document U.S. Pat. No. 4,203,952 (1) describes a process for elimination of heavy metals and transition metals other than platinum from a solution by putting the solution into contact with an inorganic solid phase including on the surface hydroxyl groups on which a silicon compound has been attached by grafting, including thiol or amine-type reactive functions having an affinity for the metal to be extracted.

The compound bound by reaction with the hydroxyl groups on the surface of the substrate has the formula:

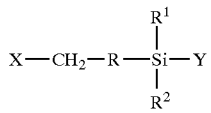

in which Y is an alkoxyl group or a halogen atom capable of reacting with the hydroxyl groups of the substrate and X represents a thiol, amino or nitrated-heterocyclic group.

The technique described in this document involves grafting of the extracting entity on the surface of the substrate which can be silica or a silica gel, but there is no binding of the extracting entity in the internal structure of the substrate.

The document Journal of Radioanalytical and Nuclear Chemistry, Articles, vol. 141, No. 1, 1990, p.107–115[(2)], describes the use of octyl(phenyl)-N,N'-diisobutyl carbamoylmethyl phosphine oxide (CMPO) on a solid silica-base support to extract europium and actinides from aqueous solutions. The support with CMPO is prepared from a support made of $SiO_2$ particles. The CMPO extractor is fixed by impregnation of the support using the solvent evaporation technique.

In this case, the extractor is not attached to the substrate by a covalent bond, and it is not integrated by chemical bonding within the structure of the substrate.

BRIEF DESCRIPTION OF THE INVENTION

This invention precisely involves inorganic-organic hybrid gels in which the extracting entity is integrated in the structure of the gel during its manufacturing.

According to the invention, the inorganic-organic hybrid gel for extraction of at least one chemical species from an aqueous solution includes a network of inorganic units with the formula:

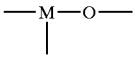

where M is Si, Ti, Zr or Al, in which organic molecules are integrated which complex the species to be extracted, each organic molecule being covalently bonded to one or several M atoms in the network.

In this gel, the organic molecules include at least one active group which has complexing properties with respect to the species to be extracted.

These molecules are thus chosen depending on the chemical species to be extracted.

If the chemical species to be extracted is a metallic cation such as an actinide and/or a lanthanide, this active group can be chosen from among the amino, ether, hydroxy, amido, pyridino and bipyridino groups, or any other organic group containing an atom which can be an electron donor (O, N, S type).

In the invention gel, the inorganic units can be silica gel, titanium oxide gel, zirconium oxide gel or alumina gel.

According to a preferred embodiment of the invention, the hybrid gel is silica-based and the inorganic units of the network are:

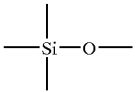

According to a first embodiment of the invention, in the organic-inorganic hybrid gel, all of the M atoms of the network are bonded to a complexing organic molecule.

A gel of this type is particularly valuable because it includes a very high density of complexing molecules having an affinity for the chemical species to be extracted.

According to a second embodiment of the invention gel, only some of the M atoms of the network are covalently bonded to a complexing organic molecule. In this case, at least 9% of the M atoms of the network are linked to complexing molecules.

The complexing molecules could, for example, be based on the following formulae:

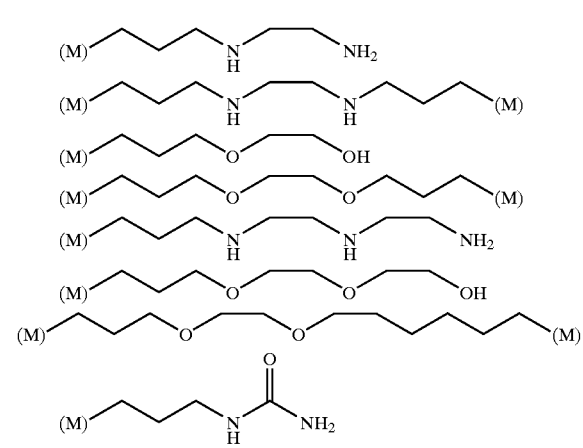

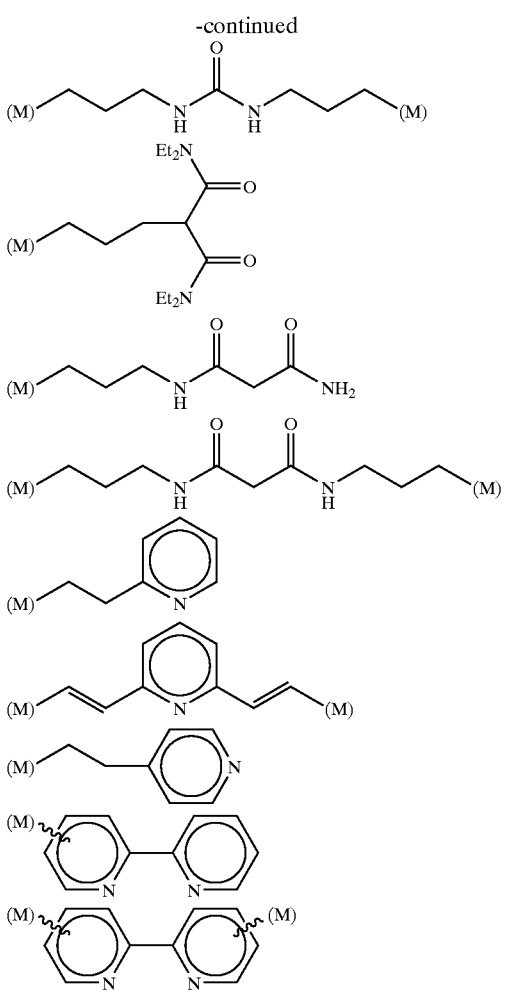

The invention also involved a process for preparing an organic-inorganic hybrid gel as defined above, from silicon alkoxides functionalised with organic groups and possibly silicon alkoxides. In this process, the sol-gel technique is used and, in the presence of water, at least one functionalised metallic alkoxide LM(OR¹)l(I) or (R¹O)l MLM(OR¹)l   (II)

in which M represents Si, Ti, Zr or Al
- L represents an organic group with at least one organic complexing group;
- R1 represents an organic group, preferably an alkyl group; and
- l=3 when M represents Si, Ti or Zr; or
- l=2 when M represents Al.

with the following formula is polymerised by polycondensation: According to a variant of the application of the invention process, the functionalised metallic alkoxide corresponding to formula (I) or (II) described above is polymerised with a metallic alkoxide with the formula:

M(OR²)$_m$   (III)

in which M represents Si, Ti, Zr or Al, R² is an organic group, preferably an alkyl group, and m=4 when M represents Si, Ti or Zr or m=3 when M represents Al.

The alkyl groups used for R1 and R2 preferably have 1 to 12 carbon atoms. In particular, methyl and ethyl groups can be used.

According to the invention, the organic complexing function(s) present in the organic group L can be in particular amino, ether, hydroxy, amido, pyridino and bipyridino groups.

Such groups L may be based on one of the following formulae for example:

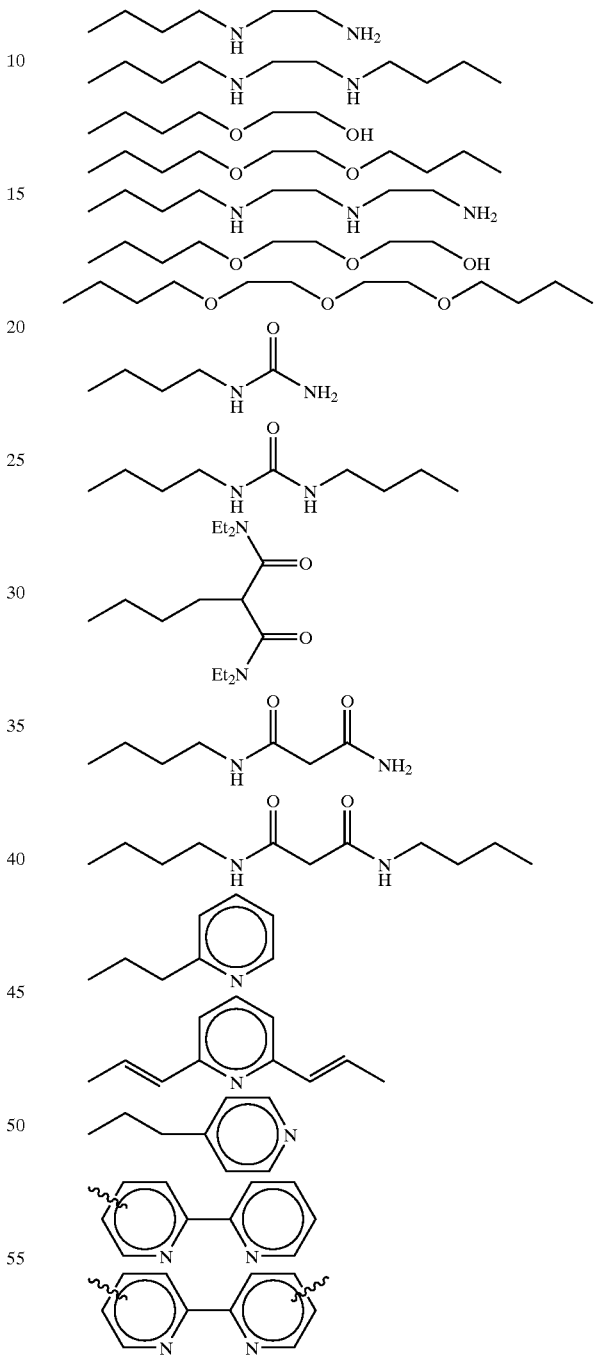

The functionalised metallic alkoxides which could be used in the invention process include, for example, those corresponding to the following formulae:

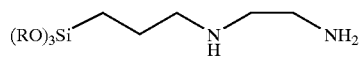

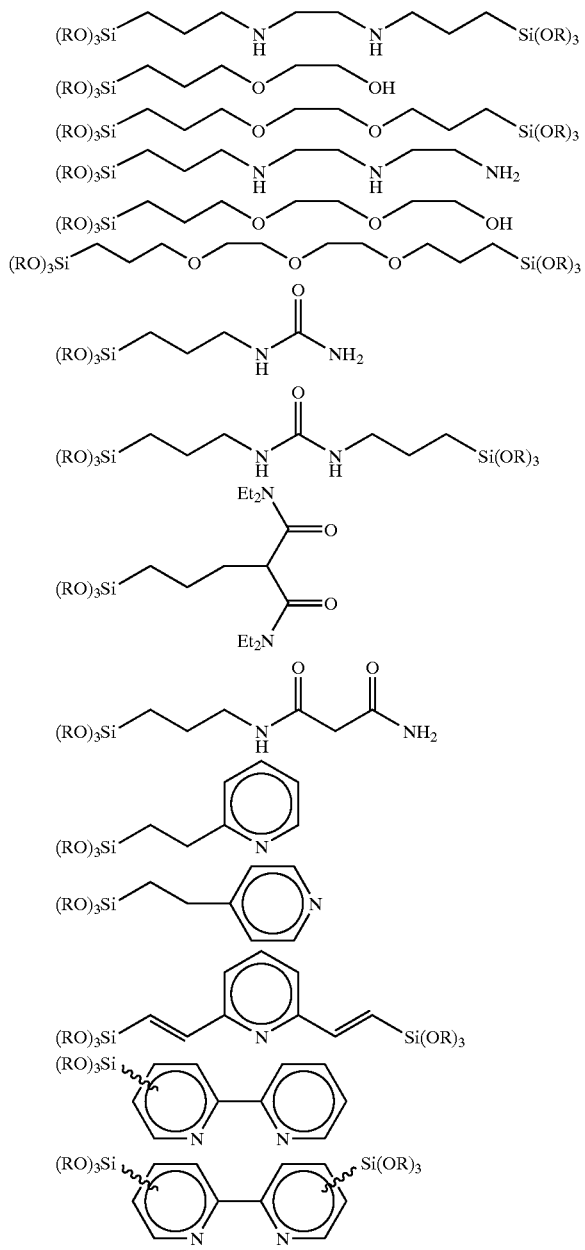

in which R is an organic group, preferably an alkyl group, having for example 1 to 12 carbon atoms, such as methyl and ethyl groups.

When the hybrid gels are obtained solely from functionalised silicon alkoxides, the gel network is formed from the following organic-inorganic units:

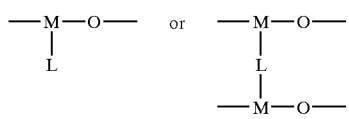

If the hybrid gel is obtained from functionalised metallic alkoxides and metallic alkoxides, the formation of the gel corresponds to the following schemes;

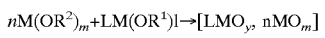

or

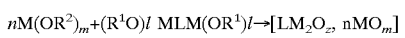

in which M, $R^1$, $R^2$, l, and m are as defined above, n is a whole number from 1 to 1000 and y and z are numbers from 1 to 4.

The resulting material is a hybrid gel of the metallic oxide M in which the organic molecules L with extracting properties are integrated by covalent bonding during the formation of the solid phase of the gel.

This mode of manufacturing differs from classic grafting processes in that the mineral support, i.e. the gel, is formed at the same time that the organic unit is integrated into the material. The stoichiometry and the molecular structure of the solid can thus be precisely controlled. By appropriately choosing the organic group L and the mineral skeleton, certain properties of the gel obtained can be varied, such as the selectivity with respect to chemical species to be extracted such as actinides, and the three-dimensional molecular structure of the material.

The following formulae are examples of hybrid silica gels in accordance with the invention:

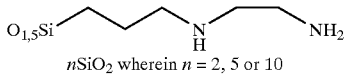
$n\mathrm{SiO}_2$ wherein $n$ = 2, 5 or 10

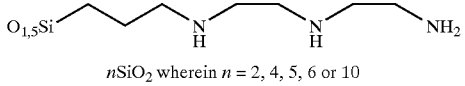
$n\mathrm{SiO}_2$ wherein $n$ = 2, 4, 5, 6 or 10

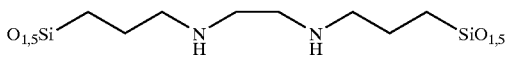
$n\mathrm{SiO}_2$ wherein $n$ = 0, 5 or 10

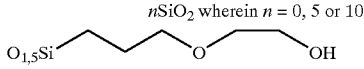
$n\mathrm{SiO}_2$ wherein $n$ = 0, 5 or 10

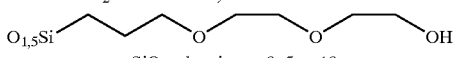
$n\mathrm{SiO}_2$ wherein $n$ = 0, 5 or 10

$n\mathrm{SiO}_2$ wherein $n$ = 0, 5 or 10

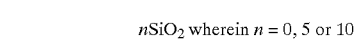
$n\mathrm{SiO}_2$ wherein $n$ = 0, 5 or 10

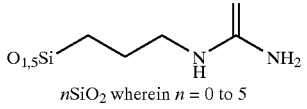
$n\mathrm{SiO}_2$ wherein $n$ = 0 to 5

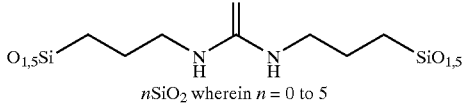
$n\mathrm{SiO}_2$ wherein $n$ = 0 to 5

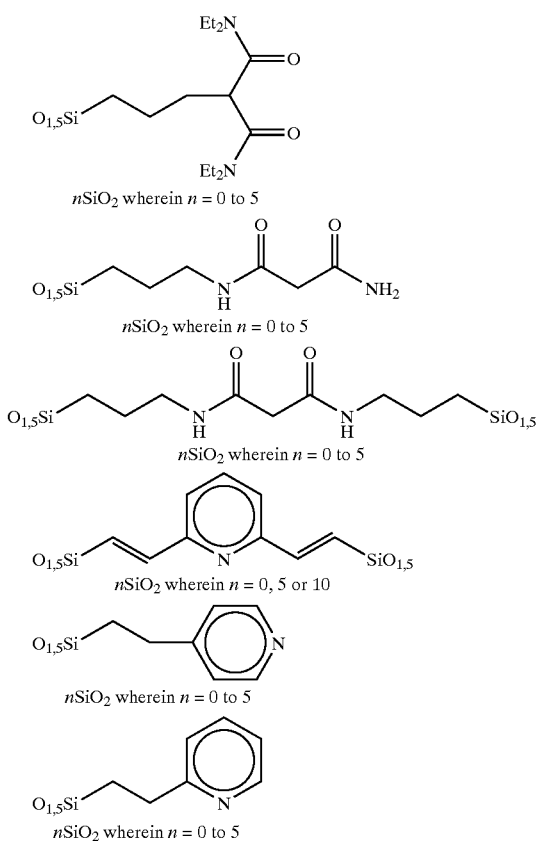

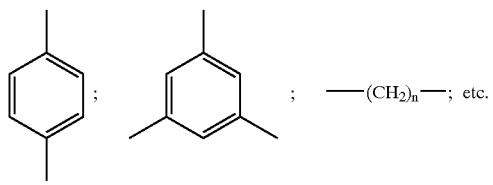

In applying the process for preparation of a hybrid gel according to the invention, the metallic alkoxide(s) are generally dissolved in an appropriate solvent such as ethanol, then water and a nucleophile catalyst such as ammonium fluoride:are added. Basic or acidic catalysts can also be used.

The quantities of solvent are generally such that they correspond to 0.5 to 1 ml of ethanol per mmole of silicon and the quantity of water added must correspond to at least 0.5 equivalents of water per alkoxyl group $OR^1$ and possibly $OR^2$ and $OR^3$ present in the metallic alkoxides used. If the metal M is silicon, the quantity of catalyst is generally 0.1% with respect to silicon.

The reaction can be carried out at room temperature, with stirring, and then letting the reaction medium sit until gelation and then leaving it to age for a week, for example.

To improve the performance of the gel obtained from this process, the gel can be made in the presence of the chemical species to be extracted in order to include this species in the gel during its manufacturing and then subjecting the gel to washing in order to eliminate this species. By an imprint effect on the molecular structure or the texture (porosity, specific surface area) of the gel (template effect), this procedure improves its selectivity with respect to the species to be extracted. This species could in particular be a metallic ion.

The invention also involves the functionalised silicon alkoxides used for preparation of the hybrid silica gels, these alkoxides being based on the following formulae:

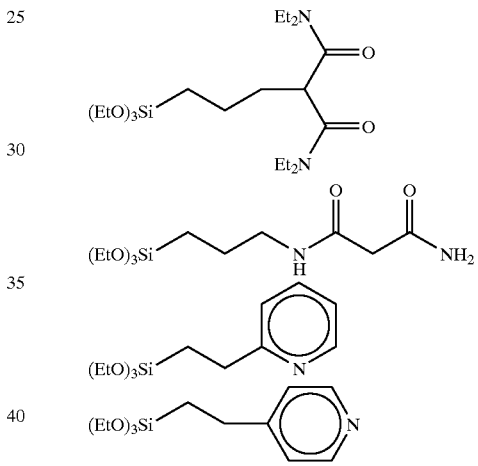

The gels obtained with the invention process can be in granular or powder form, or in the form of thin layers or membranes.

They can be used in an process for extraction of ions present in an aqueous solution by putting this solution into contact with the gel, followed by separation of the gel which has bound the ions to be extracted. For example, the ions to be extracted could be actinide and/or lanthanide ions. When a gel in granular form is used, the extraction process corresponds to an extraction chromatography and it can be done in a column filled with granular gel.

If the gel is in thin layer form, the extraction can be done by a membrane separation technique by putting in circulation on one side of the membrane the aqueous solution containing the ions to be extracted and on the other side of the membrane, an aqueous re-extraction solution.

Other characteristics and advantages of the invention will be better understood with a reading of the description which follows with examples of embodiments of the invention with reference to the appended drawings.

According to another embodiment of the invention, another chemical structure based on an appropriate alkoxide can be integrated into the structure of the gel. For example, a structure based on the formula $(R^3O)l\ M—X—M(OR^3)l$ (IV), in which M and l are as defined above, $R^3$ is an organic group, preferably an alkyl group having for example 1 to 12 carbon atoms, and X represents an organic group which is non-complexing with respect to the species to be extracted, allowing for variation in the spatial arrangement properties of the gel in order to obtain other results.

Organic groups of this type include aromatic or aliphatic groups such as those corresponding to the following formulae:

according to the invention. This figure illustrates the change in the partition coefficient Kd of americium as a function of the acidity of the aqueous solution containing the americium.

Figure 1:
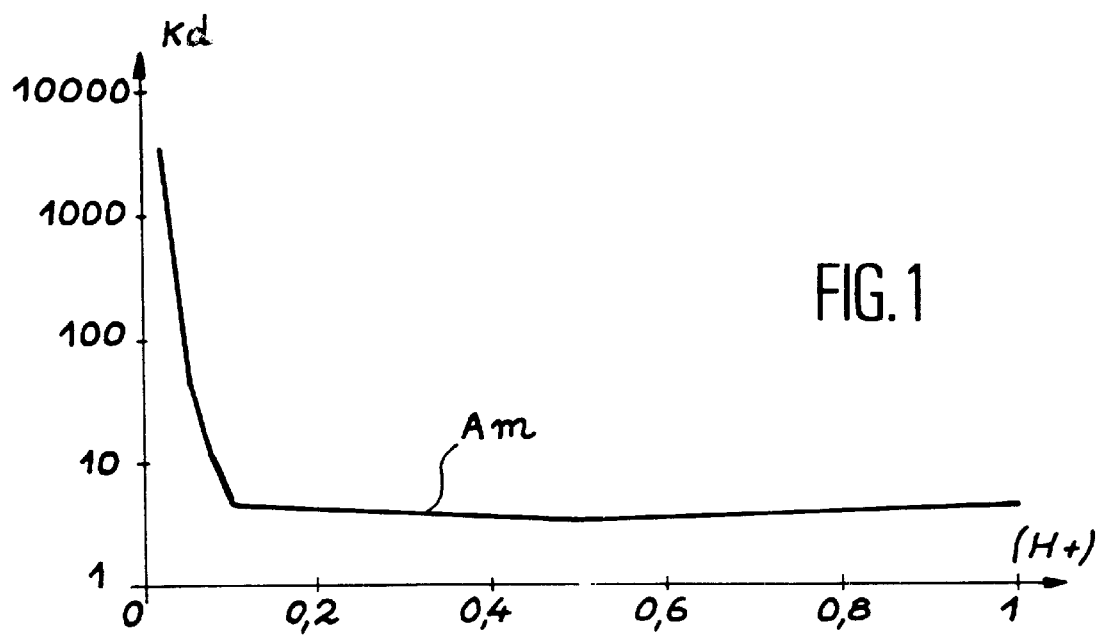
FIG. 1 is a graph illustrating the results from extracting americium from an aqueous solution using a hybrid gel The formulae given above for the gels of the invention and their preparation correspond to a totally condensed three-dimensional network. The gels obtained generally have a degree of condensation of 70 to 90% for which there are some OH or OR groups which are non-condensed. $LSiO_{1.5}$ becomes, in this case, $LSiO_x(OH)_y(OR)_z$ with $1 \leq x \leq 1.5$ and $0 \leq y+z \leq 0.5$.
Figure 2:
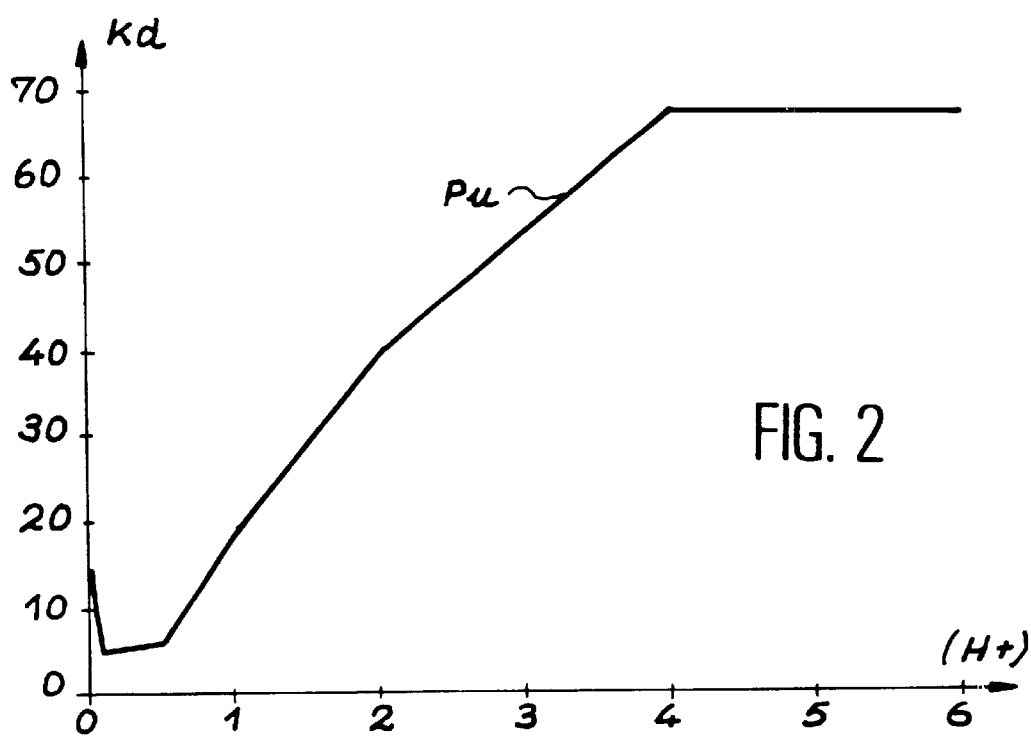

FIG. 2 illustrates the results obtained for extraction of plutonium with the gel of FIG. 1 and represents the variations of Kd as a function of the acidity of the aqueous solution.

Figure 3:
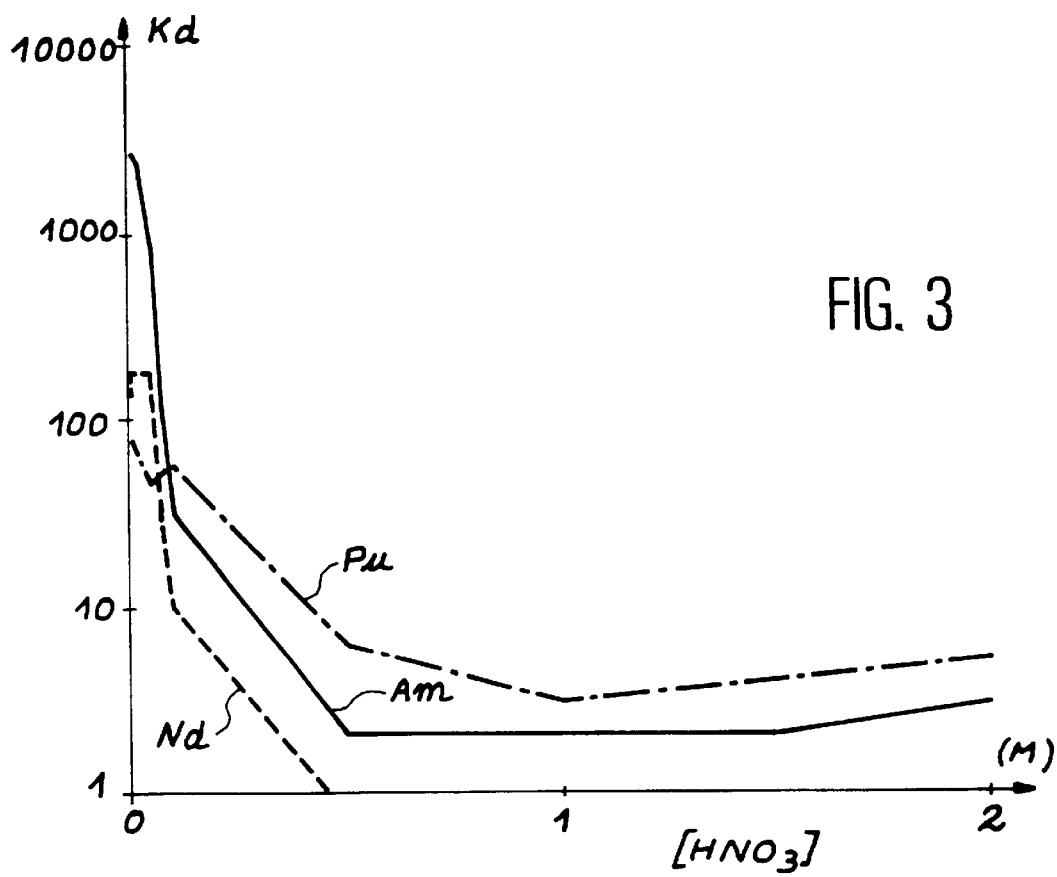

FIG. 3 illustrates the results obtained for extraction of americium, plutonium and neodymium using another gel according to the invention; it shows the changes in Kd as a function of the acidity of the aqueous solution.

Figure 4:
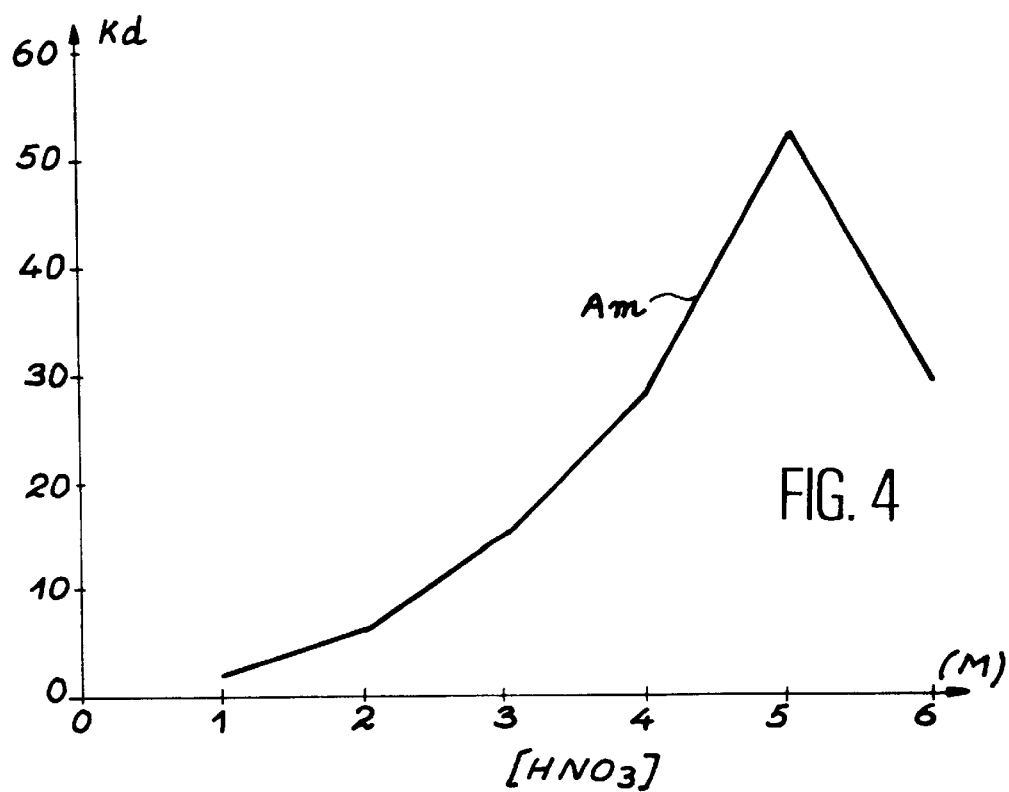

FIG. 4 illustrates results obtained for extraction of americium using another gel according to the invention. It shows the change in Kd as a function of the concentration of nitric acid (in mole/l).

DETAILED DESCRIPTION OF EMBODIMENTS OF THE INVENTION

The examples which follow illustrate the synthesis of hybrid gels in accordance with the invention and their use for extraction of americium, plutonium and neodymium from aqueous solutions.

The appended Table 1 illustrates the functionalised alkoxysilanes used in examples 6 to 25 of preparation of hybrid gels in accordance with the invention.

Examples 1 to 5 illustrate the synthesis of functionalised alkoxysilanes (compounds 3 to 7 of table 1).

For the synthesis of functionalised alkoxysilanes, all handling is done in a nitrogen atmosphere using a vacuum manifold. The reactions are carried out in Schlenk tubes, three-necked flasks or sealed tubes with mechanical or magnetic stirring. The solvents are anhydrous and distilled. The reagents are commercial (Aldrich, Acros and Gelest).

The infrared spectra IR were recorded with a Fourier transform PERKIN-ELMER 1000 spectrometer, the $^1$H and $^{13}$C NMR with a BRUKER AC 200 and $^{29}$Si with BRUKER AC 250. The mass spectra MS were obtained with a JEOL JMS-DX 300 apparatus.

EXAMPLE 1

Preparation of 4-[2-(Triethoxysilyl)ethyl]pyridine (Compound 3)

The synthesis scheme is as follows:

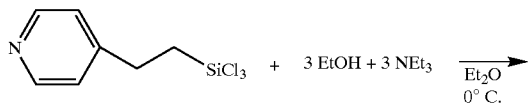

Method

A 500 ml three-neck flask equipped with a mechanical stirrer and a dropping funnel is used. It contains 250 ml of ether, 3.42 g (0.074 mole) of ethanol and 7.5 g of triethylamine (0.074 mole). The entire mixture is cooled to 0° C. 5.72 g (0.024 mole) of 4-[2-(triethoxysilyl)ethyl]pyridine (Gelest, 25% in toluene) is put in drop by drop. The temperature is then allowed to return to room temperature and the stirring is maintained for 12 hours.

The reaction medium is then filtered and evaporated with a rotating evaporator. The product is isolated by distillation (1.9 g, Y=27%).

Physical Characteristics of Compound 3

After distillation, traces of impurities are visible with $^{13}$C NMR (at 2.63 and 14.18 ppm) and $^1$H NMR (multiplet at 2.70 ppm). The elementary analysis is nonetheless in accordance with the theoretical calculation.

$Eb_{0.025}$=72° C.; colourless liquid; NMR $^1$H (CDCl$_3$, δ ppm): 0.94 (CH$_2$Si, 2H, m); 1.17 (CH$_3$, 9H, t); 2.70 (CH$_2$, 2H, m); 3.76 (OCH$_2$, 6H, q); 7.1 (CH, 2H, d); 8.45 (CH, 2H, d); NMR $^{13}$C (CDCl$_3$, δ ppm): 11.31 (CH$_2$Si); 18.25 (CH$_3$); 28.35 (CH$_2$); 58.46 (OCH$_2$); 123.29 (CH); 153.3 (C); 149.63 (CH); NMR $^{29}$Si (CDCl$_3$, δ ppm): −46.68; IR (CCl$_4$, cm$^{-1}$): $\nu_{C-H\ aryl}$=3069, $\nu_{C=C\ aryl}$=1600, $\nu_{Si-O}$=1081; $\nu_{Si-C}$=1390; MS (EI$^+$) (m/e, relative intensity): 268 (60 M$^+$); 163 (77, Si(OEt)$_3^+$); 106 (90, M− Si(OEt)$_3^+$); Elementary analysis: C$_{13}$H$_{23}$O$_3$NSi calculated: C=57.96%, H=8.60%, N=5.20%; measured: C=58.07%, H=8.60%, N=6.50%.

EXAMPLE 2

Preparation of 2-[2-(Triethoxysilyl)ethyl]pyridine (4)

The synthesis scheme is the same as before. No impurities were detected with $^1$H and $^{13}$C NMR.

Method

A 1 liter three-neck flask equipped with a mechanical stirrer and a dropping funnel is used. It contains 13.94 g of 2-[2-(triethoxysilyl)ethyl]pyridine (0.058 mole, Gelest) in suspension in 450 ml of ether and 40 ml of triethylamine (0.27 mole). The whole mixture is cooled to 0° C. 12.32 g of ethanol (0.27 mole) diluted in 40 ml of ether is added drop by drop. When it has all been added, the temperature is allowed to return to room temperature and the stirring is maintained for 12 hours. The product is isolated by distillation (7.46 g, Y=48%).

Physical Characteristics of Compound 4

$Eb_{0.15}$=90° C.; colourless liquid; NMR $^1$H (CDCl$_3$, δ ppm): 1.01 (CH$_2$Si, 2H, m); 1.12 (CH$_3$, 9H, t); 2.82 (CH$_2$, 2H, m); 3.73 (OCH$_2$, 6H, t); 6.96 (CH, 1H, t); 7.07 (CH, 1H, d); 7.46 (CH$_2$, 1H t); 8.41 (CH$_2$, 1H, d); NMR $^{13}$C (CDCl$_3$, δ ppm): 10.44 (CH$_2$Si); 18.19 (CH$_3$); 31.38 (CH$_2$); 58.28 (OCH$_2$); 120.75 (CH); 122.00 (CH); 136.16 (CH); 149.03 (CH); 163.6 (C); NMR $^{29}$Si (CDCl$_3$, δ ppm) −45.85; IR (CCl$_4$, cm$^{-1}$): $\nu_{Si-O}$=1080, $\nu_{Si-C}$=1389, $\nu_{C-H\ aryl}$=3068, $\nu_{C=C\ aryl}$=1592, 1474 and 1434; MS (EI$^+$) (m/e, relative intensity): 269 (19, M$^+$); 163 (19, Si(OEt)$_3^+$); 106 (100, M− Si(OEt)$_3^+$); Elementary analysis: C$_{13}$H$_{23}$O$_3$NSi calculated: C=57.96%, H=8.60%, N=5.20%; measured: C=57.80%, H=8.83%, N=5.20%.

EXAMPLE 3

Preparation of N,N'di(Triethoxysilylpropyl)-1,3 Propanediamide (5)

The synthesis scheme is as follows:

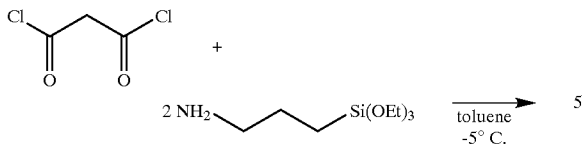

The purification of the product has not been done: it degrades during distillation or passage through a silica column, even when protected. Nonetheless, very few impurities were detected by NMR; the difference observed during the analysis with respect to the theoretical calculation can be attributed to a partial hydrolysis before or during the analysis.

Method

A 500 ml three-neck flask equipped with a mechanical stirrer, a dropping funnel and a thermometer is used. 200 ml of toluene, 34,48 g of aminopropyltriethoxysilane (0.156 mole) and 16 g of triethylamine (0.158 mole) are added. The temperature of the reaction medium is lowered to $-15°$ C. The malonyl dichloride is added drop by drop so that the temperature does not exceed $-5°$ C. When it has all been added, the temperature is allowed to return to room temperature and the stirring is maintained for 12 hours. The reaction medium is filtered and the toluene is evaporated with a rotating evaporator. The traces are eliminated with a vacuum manifold. 28 g are obtained (Y=70%).

Physical Characteristics of Compound 5

Very viscous orange-coloured liquid; NMR $^1$H (CDCl$_3$, δ ppm): 0.61 (CH$_2$Si, 4H, t); 1.21 (CH$_3$, 18H, t); 1.62 (CH$_2$, 4H, m); 3.13 (CH$_2$ in position 2, 2H, s); 3.21 (NCH$_2$, 4H, q); 3.78 (OCH$_2$, 12H, q); 7.26 (NH); NMR $^{13}$C (CDCl$_3$, δ ppm): 7.43 (CH$_2$Si); 18.19 (OCH$_2$CH$_3$); 22.69 (CH$_2$CH$_2$CH$_2$); 42.01 (CH$_2$NH); 42.61 (CH$_2$ in position 2); 58.47 (OCH$_2$); 167.49 (C(O)); NMR $^{29}$Si (CDCl$_3$, δ ppm): $-46.57$; IR (CCl$_4$, cm$^{-1}$): $\nu_{Si-O}=1081$, $\nu_{Si-O}=1390$, $\nu_{C(O)}=1665$; MS (EI$^+$) (m/e, relative intensity): 510 (0.88, M$^+$); 163 (100, Si(OEt)$_3$$^+$); 465 (8.36, M– EtO$^+$); Elementary analysis: C$_{21}$H$_{45}$O$_8$N$_2$Si$_2$ calculated: C=49.48%, H=8.90%, N=5.50%; measured: C=47.87%, H=8.91%, N=5.53%.

EXAMPLE 4

Preparation of N-Triethoxysilylpropyl-1,3 Propanediamide (6)

The synthesis scheme is as follows:

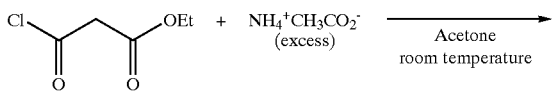

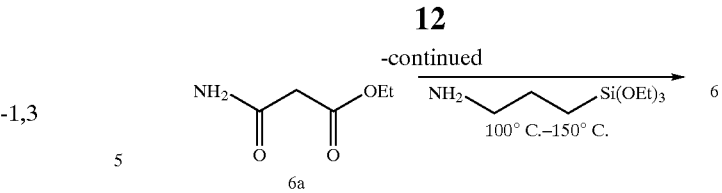

Step 1: Synthesis of Malonamate 6a

Method

A 1 liter three-neck flask equipped with a mechanical stirrer and a dropping funnel is used. 500 ml of acetone and 60 g (0.78 mole) of ammonium acetate are put in the flask. 53.2 g (0.35 mole) of chloroethylmalonyl is added drop by drop. The stirring is maintained for 2 hours after it has been completely added. The reaction medium is filtered, the solvent is eliminated with a rotating evaporator. The product is isolated by distillation (log, Y=22%).

Physical Characteristics of Compound 6a

Yellow liquid Eb$_1$=110° C.; NMR $^1$H (CDCl$_3$, δ ppm): 1.21 (CH$_3$, 3H, t); 3.24 (CH$_2$, 2H, s); 4.12 (OCH$_2$, 2H, q); 6.5 (NH) 7.6 (NH); NMR $^{13}$C (CDCl$_3$, δ ppm): 13.96 (CH$_3$); 41.30 (CH$_2$); 61.51 (OCH$_2$); 168.13 (C(O)); 168.99 (C(O)); IR (CCl$_4$, cm$^{-1}$): $\nu_{C(O)ester}=1731$, $\nu_{C(O)amide}=1684$; MS (EI$^+$) (m/e, relative intensity): 130 (30, M$^+$); 28 (100, CO$^+$); 58 (62, $^+$CH$_2$C(O)NH$_2$), 115 (7, M–NH$_2$$^+$).

Step 2: Synthesis of N-Triethoxysilylpropyl-1,3 Propanediamide 6

Method

In a sealable tube equipped with a magnetic stirrer, 1.32 g (0.01 mole) of malonamate 6a and 2.5 g (0.01 mole) of aminopropyltriethoxysilane is put in. After depressurising, the tube is sealed. It is then heated to between 100 and 150° C. for 12 hours. The ethanol formed is eliminated by evaporation using the vacuum manifold.

Physical Characteristics of Compound 6

Very viscous orange-coloured liquid; NMR $^1$H (CDCl$_3$, δ ppm): 0.59 (CH$_2$Si, 2H, t); 1.17 (CH$_3$, 9H, t); 1.55 (CH$_2$CH$_2$CH$_2$, 2H, m); 3.14 (CH$_2$ in position 2, 2H, s); 3.18 (NHCH$_2$, 2H, m); 3.77 (OCH$_2$, 6H, q); NMR $^{13}$C (DMSO d$^6$, δ ppm): 6.82 (CH$_2$Si); 17.80 (CH$_3$); 22.09 (CH$_2$CH$_2$CH$_2$); 41.38 (CH$_2$NH); 42.81 (CH$_2$ in position 2); 57.84 (OCH$_2$); 167.28 (C(O)); 169.91 C(O); NMR $^{29}$Si (CDCl$_3$, δ ppm): $-45.74$; IR (CCl$_4$, cm$^{-1}$): $\nu_{Si-O}=1080$, $\nu_{Si-C}=1390$, $\nu_{C(O)}=1669$; MS (EI$^+$) (m/e, relative intensity): 307 (0.4, M$^+$); 163 (100, Si(OEt)$_3$$^+$); 261 (20, M– EtO$^+$); Elementary analysis: C$_{12}$H$_{26}$O$_5$N$_2$Si calculated: C=47.04%, H=8.55%, N 9.14%; measured: C=47.00%, H=8.78%, N=9.29%.

EXAMPLE 5

Preparation of N,N,N',N'-Tetraethyl-2 Propyltriethoxysilyl-1,3 Propanediamide (7)

The synthesis scheme is as follows:

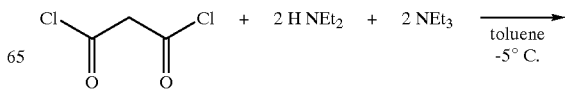

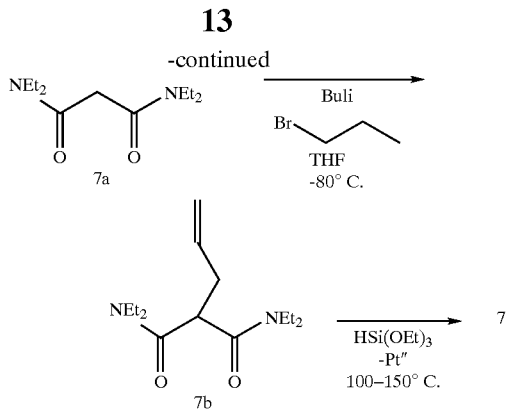

All of the intermediary products were purified, either by distillation (7a), or by passage through a silica column (7b). The final product 7 is purified (elimination of catalyst) by distillation.

Step 1: Synthesis of N,N,N',N'-Tetraethyl-1,3 Propanediamide (7a)

Method 53 g (0.72 mole) of diethylamine and 200 ml of toluene are put into a 500 ml three-neck flask equipped with a mechanical stirrer and a dropping funnel. The temperature is lowered to −15° C. and 50 g (0.35 mole) of malonyl dichloride is added drop by drop. The reaction medium is stirred for 2 hours. It is then filtered and the toluene is eliminated with a rotating evaporator and then a vacuum manifold. The diamide 7a is isolated by distillation. 19.6 g is obtained (Y=26%).

Physical Characteristics of Compound 7a

Viscous yellow liquid, $Eb_{0.015}=110°$ C.; NMR $^1H$ (CDCl$_3$, δ ppm): 1.14 (CH$_3$, 12H, m); 3.43 (CH$_2$, 2H, s); 3.38 (NCH$_2$, 8H, m); NMR $^{13}C$ (CDCl$_3$, δ ppm): 12.70 and 13.98 (NCH$_2$CH$_3$); 40.06 and 42.43 (NCH$_2$); 40.44 (CH$_2$); 166.19 (C(O)); IR (CCl$_4$, cm$^{-1}$): $\nu_{C(O)}=1636$; MS (EI$^+$) (m/e, relative intensity): 214 (10, M$^+$); 215 (20, M+1$^+$); 72 (100, Net$_2^+$); 142 (20, M− NEt$_2^+$).

Step 2: Synthesis of N,N,N',N'-Tetraethyl-2-propen-1-yl-1,3 Propanediamide (7b)

Method 250 ml of tetrahydrofuran THF and 11.26 g (0.0526 mole) of the diamide 7a are put into a 500 ml three-neck flask with two dropping funnels, a thermometer and a magnetic stirrer. The medium is cooled to −80° C. 33 ml of butyl lithium (1.6 M, 0.053 mole) and 6.5 g (0.0537 mole) of allyl bromide diluted with 27 ml of THF are added simultaneously. The temperature should not exceed −50° C. during the addition. Once the addition is finished, the medium can come to room temperature. The stirring is maintained for 3 hours.

The THF is eliminated by means of a rotating evaporator. The residual liquid is redissolved in dichloromethane, washed with water, dried on magnesium sulphate then evaporated again with a rotating evaporator and vacuum manifold. The purification is done on a column of silica with ethyl acetate as the eluant (R$_f$=0.55) 8 g of compound 7b is obtained (Y=60%).

Physical Characteristics of Compound 7b

NMR $^1H$ (CDCl$_3$, δ ppm): 1.13 (CH$_3$, 12H, t); 2.64 (CH$_2$, 2H, t); 3.35 (NCH$_2$, 8H, m); 3.63 (CH, 1H, d); 5.06 (CH=CH$_2$, 2H, m); 5.86 (CH=CH$_2$, 1H, m); NMR $^{13}C$ (CDCl$_3$, δ ppm): 12.63 and 14.00 (CH$_3$); 33.86 (CH$_2$CH=CH$_2$); 40.22 and 41.42 (NCH$_2$); 49.57 (CH); 116.28 (CH=CH$_2$); 136.10 (CH=CH$_2$); 168.15 (C(O); IR (CCl$_4$, cm$^{-1}$): $\nu_{C(O)}=1633$; MS (EI$^+$) (m/e, relative intensity): 255 (15, M$^+$); 72 (100, Net$_2^+$); 182 (10, M− NEt$_2^+$). Elementary analysis: C$_{14}$H$_{26}$O$_2$N$_2$ calculated: C=66.11%, H=10.30%, N=11.01%; measured: C=65.80%, H=10.14%, N=10.88%.

Step 3: Synthesis of N,N,N',N'-Tetraethyl-2 Propyltriethoxysilyl-1,3 Propanediamide (7)

Method 5.84 g (0.023 mole) of compound 7b, 4.71 g (0.0287 mole) of triethoxysilane and 92 mg of a 10.7% solution of Pt (0.2% with respect to the diamide) are placed in a sealable tube equipped with a magnetised bar. The tube is depressurised and sealed. It is heated to 120 degrees Celsius for 5 hours and then kept overnight at 70 degrees Celsius. The product is isolated by distillation.

Physical Characteristics of Compound 7

Viscous yellow liquid; $Eb_{0.01}=140°$ C. NMR $^1H$ (CDCl$_3$, δ ppm): 0.64 (CH$_2$Si, 2H, t); 1.06 (CH$_3$, 21H, m); 1.40 (CH$_2$CH$_2$CH$_2$, 2H, m); 1.84 (CH$_2$CH$_2$, 2H, q); 3.37 (NCH$_2$, 8H, q); 3.45 (CH, 2H, t); 3.72 (OCH$_2$, 6H, q); NMR $^{13}C$ (CDCl$_3$, δ ppm): 10.31 (CH$_2$Si); 12.61 and 13.99 (NCH$_2$CH$_3$); 18.20 (OCH$_2$CH$_3$); 21.71 (CH$_2$CH$_2$CH$_2$CH$_2$); 32.73 (CHCH$_2$); 40.25 and 41.4 (NCH$_2$); 50.22 (CH); 58.23 (OCH$_2$); 168.59 (C(O)); NMR $^{29}Si$ (CDCl$_3$, δ ppm): −45.24; IR (CCl$_4$, cm$^{-1}$): $\nu_{Si-O}=1081$, $\nu_{C(O)}=1630$; MS (EI$^+$) (m/e, relative intensity): 419 (40, M$^+$); 163 (40, Si(OEt)$_3^+$); 72 (73, NEt$_2^+$); 346 (25, M−NEt$_2^+$); Elementary analysis: C$_{20}$H$_{42}$O$_5$N$_2$Si calculated: C=57.38%, H=10.11%, N=6.69%; measured: C=57.46%, H=9.98%, N=6.77%.

Examples 6 to 25 which follow illustrate the synthesis of hybrid silica gels in accordance with the invention. They are synthesised by. hydrolysis and catalytic polycondensation (NH$_4$F) of the functionalised alkoxysilanes of table 1 with, possibly, tetraethoxysilane Si(OEt)$_4$.

The reaction scheme is as follows:

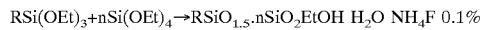

with n=0 to 5.

In all of these examples, ethanol is used as the solvent, water for hydrolysis and NH$_4$F as catalyst in the following quantities:

ethanol: 1 ml per mmole of silicon;
  water: 0.5 equivalents per ethoxy group;
  NH$_4$F: 0.1% molar with respect to silicon The references for the gels and the alkoxysilanes used for their preparation are given in table 2 in appendix.

The reaction is carried out at room temperature in a Schenk tube equipped with magnetic stirring. The water and the catalyst are added last. The medium is left to sit until. gelation, then it is left to age for one week. The gel is then subjected to the following treatments.

The ethanol is eliminated by vacuum heating of the gel (70° C.) for 12 hours. The solid obtained is ground and then washed with ether. The ether is eliminated by vacuum evaporation and the material is once again ground.

For determination of the physical characteristics of the gels, the infrared spectra were recorded on a PERKIN-ELMER 1000 spectrometer, the NMR of the CP-MAS solid $^{13}C$ and $^{29}Si$ on a BRUKER FTAM 300; the nitrogen adsorption-desorption curves for the BET and BJH calculations were obtained with a Micromeritics 2375 apparatus.

EXAMPLE 6

Preparation of Hybrid Silica Gel 8a

The quantities of reagents used are the following:
- 8.3 g of 50% alkoxysilane 1 of table 1 in methanol (15.7 mmoles);
- 10.5 ml of methanol;
- 407 mg $H_2O$ (22.6 mmoles);
- 16 µl of $NH_4F$ 1M (16 µmoles).

After three weeks, an opaque white gel is obtained. The gel is treated as described earlier. 2.11 g is obtained.

Physical Characteristics of Gel 8a

White powder; IRTF (KBr, cm$^{-1}$): $v_{Si-O}$=1025, $v_{O-H}$=3359, $v_{C=O}$=1664, $v_{N-H}$=1560 and 1602, $v_{C-H}$=2939; NMR $^{13}$C with CP-MAS (δ, ppm): 10.51 ($CH_2Si$), 23.93 ($CH_2CH_2CH_2$) and residual $OCH_2CH_3$); 42.60 ($CH_2NH$); 50.00 ($OCH_3$ of methoxys exchanged with the ethoxys); 60.47 (residual $OCH_2$); 160.92 (C(O)); NMR $^{29}$Si with CP-MAS (δ, ppm): −58.95 ($T^2$), −66.54 ($T^3$), $T^3>T^2$; B.E.T.: S≈1 m$^2$/g; Elementary analysis: $C_4H_9N_2O_{2.5}Si$ %C=31.36, %H=5.92, %N=18.29; %O=26.11, %Si=18.33 for a complete condensation; measured: $C_{4.11}H_{10.92}N_{1.6}O_{3.39}Si$, %C=29.84, %H=6.66, %N=13.64; %O=32.86, %Si=17.

EXAMPLE 7

Preparation of Hybrid Silica Gel 8b

The quantities of reagents used are the following:
- 9.68 g of 50% alkoxysilane 1 in methanol (18.3 mmoles);
- 7.66 g of $Si(OEt)_4$ (36.8 mmoles);
- 55 ml of methanol;
- 1.81 g $H_2O$ (0.101 mole);
- 55 µl of $NH_4F$ 1M (55 µmole).

An opaque white gel is obtained in less than 12 hours. After treatment, 5.4 g is recovered.

Physical Characteristics of Gel 8b

White powder; IRTF (KBr, cm$^{-1}$): $v_{Si-O}$=1070, $v_{O-H}$=3372, $v_{C=O}$=1666, $v_{N-H}$=1557 and 1602, $v_{C-H}$=2949; NMR $^{13}$C with CP-MAS (δ, ppm): 9.94 ($CH_2Si$), 24.40 ($CH_2CH_2CH_2$); 18.85 (residual $OCH_2CH_3$); 44.13 ($CH_2NH$); 51.96 ($OCH_3$ of methoxys exchanged with the ethoxys); 61.62 (residual $OCH_2$) 162.3 (C(O)); NMR $^{29}$Si with CP-MAS (δ, ppm): −51.2 ($T^1$), −58.5 ($T^2$), −66.2 ($T^3$), −92.3 ($Q^2$), −102.1 ($Q^3$), −109.8 ($Q^4$), $T^3>T^2>T^1Q^4>Q^3>>Q^2$; B.E.T.: S≈6 m$^2$/g; Elementary analysis: $C_{1.33}H_3N_{0.67}O_{2.17}Si$, %C=17.57, %H=3.32, %N=10.25; %O=38.05, %Si=30.82 for a complete condensation; measured: $C_{1.29}H_{4.03}N_{0.55}O_{2.90}Si$, %C=15.26, %H=3.99, %N=7.61; %O=45.54, %Si=27.60.

EXAMPLE 8

Preparation of Hybrid Silica Gel 8c

The quantities of reagents used are the following:
- 5.75 g of 50% alkoxysilane 1 in methanol (10.87 mmoles);
- 11.24 g of $Si(OEt)_4$ (54.04 mmoles);
- 62 ml of methanol;
- 2.47 g $H_2O$ (0.137 mole);
- 66 µl of $NH_4F$ 1M (55 µmole)

An opaque white gel is obtained in less than 12 hours. After treatment, 5.4 g is recovered.

Physical Characteristics of Gel 8c

White powder; IRTF (KBr, cm$^{-1}$): $v_{Si-O}$=1075, $v_{O-H}$=3402, $v_{C=O}$=1660, $v_{N-H}$=1557 and 1602, $v_{C-H}$=2949; NMR $^{29}$Si with CP-MAS (δ, ppm): −57.2 ($T^2$), −66.3 ($T^3$) −93.4 ($Q^2$), −102.8 ($Q^3$), −109.8 ($Q^4$), $T^3>T^2$, $Q^3>Q^4>>Q^2$; B.E.T.: S≈454 m$^2$/g; $V_{total\ porous}$=0.3768 cm$^3$/g, $S_{microporous}$=16 m$^2$/g, $\Phi_{average\ of\ pores}$=33 Å; Elementary analysis: $C_{0.8}H_{1.8}N_{0.4}O_{2.5}Si$, %C=11.29, %H=2.13, %N=6.58; %O=47.0, %Si=33.00 for a complete condensation; measured: $C_{0.95}H_{6.77}N_{0.29}O_{2.13}Si$, %C=13.47, %H=8.09, %N=4.83; %O=40.31, %Si=33.30.

EXAMPLE 9

Preparation of Hybrid Silica gel 9a

The quantities of reagents used are the following:
- 8.35 g of 60% alkoxysilane 2 in ethanol (11.36 mmoles);
- 23 ml of ethanol;
- 613 mg $H_2O$ (34 mmole)
- 23 µl of 1M $NH_4F$ (23 µmole).

An opaque white gel is obtained in less than 12 hours. After treatment, 2.77 g is recovered.

Physical Characteristics of Gel 9a

White powder; IRTF (KBr, cm$^{-1}$): $v_{Si-O}$=1070, $v_{O-H}$=3401, $v_{C=O}$=1654, $v_{N-H}$=1570, $v_{C-H}$=2949; NMR $^{13}$C with CP-MAS (δ, ppm): 10.01 ($CH_2Si$), 24.39 ($CH_2CH_2CH_2$); 17.62 (residual $OCH_2CH_3$); 42.57 ($CH_2NH$); 58.07 ($OCH_2CH_3$); 159.68 (C(O)); NMR $^{29}$Si with CP-MAS (δ, ppm): −61.9 ($T^2$), −66.91 ($T^3$), $T^3>T^2$; Elementary analysis: $C_7H_{14}N_2O_4Si_2$, %C=34.13, %H=5.73, %N=11.37; %O=25.98, %Si=22.80 for a complete condensation; measured: $C_{8.22}H_{19.85}N_{1.73}O_{5.66}Si_2$, %C=34.08, %H=6.91, %N=8.35; %O=31.26, %Si=19.40.

EXAMPLE 10

Preparation of Hybrid Silica Gel 9b

The quantities of reagents used are the following:
- 7.00 g of 60% alkoxysilane 2 in ethanol (9.52 mmoles);
- 9.9 g of $Si(OEt)_4$ (47.60 mmoles);
- 63 ml of ethanol;
- 2.23 g $H_2O$ (0.124 mmole);
- 67 µl of 1M $NH_4F$ (60 µmole)

An opaque white gel is obtained in less than 12 hours. After treatment, 5.55 g is recovered.

Physical Characteristics of Gel 9b

White powder; IRTF (KBr, cm$^{-1}$): $v_{Si-O}$=1075, $v_{O-H}$=3429, $v_{C=O}$=1654, $v_{N-H}$=1570, $v_{C-H}$=2982; Elementary analysis: $C_{1.6}H_{3.6}N_{0.8}O_5Si_2$, %C=11.29, %H=2.13, %N=6.58; %O=47.00, %Si=33 for a complete condensation; measured: $C_{1.89}H_{13.54}N_{0.58}O_{4.25}Si_2$, %C=13.47, %H=8.09, %N=4.83; %O=40.31, %Si=33.30.

EXAMPLE 11

Preparation of Hybrid Silica Gel 10a

The quantities of reagents used are the following:
- 1.24 g of alkoxysilane 3 (4.61 mmoles);
- 3.85 9 of $Si(OEt)_4$ (18.51 mmoles)
- 23 ml of ethanol;
- 0.78 g $H_2O$ (43.33 mmole);
- 23 µl of 1M $NH_4F$ (74 µmole).

An opaque white gel is obtained after 24 to 36 hours. After treatment, 2.06 g is recovered.

Physical Characteristics of Gel 10a

White powder; IRTF (KBr, cm$^{-1}$): $v_{Si-O}$=1068, $v_{O-H}$=3420, $v_{C-C\ aryl}$=1613; NMR $^{13}$C with CP-MAS (δ, ppm): 17.2 (CH$_3$), 28.8 (CH$_2$—Ph); 57.3 (OCH$_2$); 123.6 (CH$_{aryl}$); 148.7 (CH$_{aryl}$); 155.55 (C$_{aryl}$); NMR $^{29}$Si with CP-MAS (δ, ppm): −66.8 (T$^3$), −102.1 (Q$^3$), −110.3 (Q$^4$); B.E.T. : S≈406 m$^2$/g.

EXAMPLE 12

Preparation of Hybrid Silica Gel 11a

The quantities of reagents used are the following:
3.98 g of alkoxysilane 4 (14.90 mmoles);
12.26 g of Si(OEt)$_4$ (59.50 mmoles)
74 ml of ethanol;
2.55 g H$_2$O (0.142 mole);
74 μl of 1M NH$_4$F (74 μmole)

An opaque white gel is obtained after 24 to 36 hours. After treatment, 5.27 g is recovered.

Physical Characteristics of Gel 11a

White powder; IRTF (KBr, cm$^{-1}$): $v_{Si-O}$=1072, $v_{O-H}$=3401, $v_{C-C}$=2982, $v_{C=C\ aryl}$=1602, 1573, 1482, 1442; NMR $^{13}$C with CP-MAS (δ, ppm): 14.4 (CH$_2$Si), 17.4 (CH$_3$); 30.8 (CH$_2$CH$_2$Si); 59.0 (OCH$_2$); 121.7 (2CH$_{aryl}$); 136.5 (CH$_{aryl}$), 147.7 (CH$_{aryl}$), 163.4 (C$_{aryl}$); NMR $^{29}$Si with CP-MAS (δ, ppm): −61.9 (T$^2$), −66.8 (T$^3$), −102.0 (Q$^3$), −110.1 (Q$^4$); B.E.T.: S≈355 m$^2$/g.

EXAMPLE 13

Preparation of Hybrid Silica Gel 12a

The quantities of reagents used are the following:
3.4 g of alkoxysilane 5 (6.67 mmoles);
16 ml of ethanol;
432 mg H$_2$O (20 mmoles);
16 μl of 1M NH$_4$F (16 μmole)

A yellow gel is obtained after 12 hours. The gel is treated as described previously. 2.50 g is recovered.

Physical Characteristics of Gel 12a

Yellow powder; IRTF (KBr, cm$^{-1}$): $v_{Si-O}$=1044, $v_{O-H}$=3447, $v_{C=O}$=1654, $v_{N-H}$=1541, $v_{C-H}$=2936; NMR $^{13}$C with CP-MAS (δ, ppm): 10.53 (CH$_2$Si), 18.49 (residual OCH$_2$CH$_3$), 23.16 (CH$_2$CH$_2$CH$_2$), 43.33 (CH$_2$NH); 58.70 (residual OCH$_2$CH$_3$); 170.40 (C(O)); NMR $^{29}$Si with CP-MAS (δ, ppm): −53.49 (T$^1$), −61.08 (T$^2$), −67.39 (T$^3$), T$^3$>T$^2$>>T$^1$; B.E.T.: S≈0.1 m$^2$/g. Elementary analysis: C$_9$H$_{16}$N$_2$O$_5$Si$_2$, %C=37.48, %H=5.59, %N=9.71; %O=27.74, %Si=19.48 for a complete condensation; measured: C$_{9.44}$H$_{19.35}$N$_{1.88}$O$_{6.65}$Si$_2$, %C=35.24, %H=6.06, %N=8.18; %O=33.07, %Si=17.45.

EXAMPLE 14

Preparation of Hybrid Silica Gel 12b

The quantities of reagents used are the following:
3.29 g of alkoxysilane 5 (6.65 mmoles);
1.38 9 of Si(OEt)$_4$ (6.64 mmoles);
20 ml of ethanol;
581 mg H$_2$O (32.3 mmoles);
20 μl of 1M NH$_4$F (20 μmole)

After a week, gelation still has not occurred. 200 μl of 1M NH$_4$F is added. The gelation then occurs within minutes. After treatment, 2.27 g is recovered.

Physical Characteristics of Gel 12b

Yellow powder; IRTF (KBr, cm$^{-1}$): $v_{Si-O}$=1049, $v_{O-H}$=3423, $v_{C=O}$=1667, $v_{N-H}$=1552, $v_{C-H}$=2941; NMR $^{13}$C with CP-MAS (δ, ppm): 10.16 (CH$_2$Si), 17.07 (residual OCH$_2$CH$_3$), 22.66 (CH$_2$CH$_2$CH$_2$), 42.14 (CH$_2$NH); 58.28 (residual OCH$_2$CH$_3$); 168.25 (C(O)); NMR $^{29}$Si with CP-MAS (δ, ppm): −53.60 (T$^1$), −60.00 (T$^2$), −67.39 (T$^3$), −101.8 (Q$^3$), −109 (Q$^4$), T$^3$>T$^2$>>T$^1$≈Q$^3$>Q$^4$; B.E.T.: S≈106 m$^2$/g; V$_{total\ porous}$=0.0995 cm$^3$/g, no microporosity, Φ$_{average\ of\ pores}$=38 Å; Elementary analysis: C$_6$H$_{10.66}$N$_{1.33}$O$_{4.66}$Si$_2$, %C=31.02, %H=4.63, %N=8.043; %O=32.14, %Si=24.18 for a complete condensation; measured: C$_{6.98}$H$_{14.18}$N$_{1.23}$O$_{6.04}$Si$_2$, %C=31.26, %H=5.33, %N=6.42; %O=36.04, %Si=20.95.

EXAMPLE 15

Preparation of Hybrid Silica Gel 12c

The quantities of reagents used are the following:
2.46 g of alkoxysilane 5 (4.82 mmoles);
2.00 g of Si(OEt)$_4$ (9.65 mmoles);
20 ml of ethanol;
602 mg H$_2$O (33.3 mmoles);
20 μl of 1M NH$_4$F (20 μmole).

After a week, gelation still has not occurred. 200 μl of 1M NH$_4$F is added. The gelation then occurs within minutes. After treatment, 2.03 g is recovered.

Physical Characteristics of Gel 12c

Yellow powder; IRTF (KBr, cm$^{-1}$): $v_{Si-O}$=1046, $v_{O-H}$=3309, $v_{C=O}$=1560, $v_{N-H}$=1560, $v_{C-H}$=2941; NMR $^{13}$C with CP-MAS (δ, ppm): 10.01 (CH$_2$Si), 16.97 (residual OCH$_2$CH$_3$), 22.35 (CH$_2$CH$_2$CH$_2$), 42.96 (CH$_2$NH); 57.42 (residual OCH$_2$CH$_3$); 168.38 (C(O)); NMR $^{29}$Si with CP-MAS (δ, ppm): −53.20 (T$^1$), −58.0 (T$^2$), −65.1 (T$^3$), −100.5 (Q$^2$), −104.4 (Q$^3$), −110.1 (Q$^4$), T$^3$>T$^2$>T$^1$, T$^2$≈Q$^2$≈Q$^4$>Q$^3$;

EXAMPLE 16

Preparation of Hybrid Silica Gel 12d

The quantities of reagents used are the following:
2.06 g of alkoxysilane 5 (4.04 mmoles);
2.52 g of Si(OEt)$_4$ (12.1 mmoles)
24 ml of ethanol;
640 mg H$_2$O (35.56 mmoles);
24 μl of 1M NH$_4$F (24 μmole)

After a week, gelation still has not occurred. 200 μl of 1M NH$_4$F is added. The gelation then occurs within minutes.

Physical Characteristics of Gel 12d

Yellow powder; IRTF (KBr, cm$^{-1}$): $v_{Si-O}$=1059, $v_{O-H}$=3423, $v_{C=C}$=1669, $v_{N-H}$=1558, $v_{C-H}$=2941; NMR $^{13}$C with CP-MAS (δ, ppm): 9.76 (CH$_2$Si), 16.91 (residual OCH$_2$CH$_3$), 21.86 (CH$_2$CH$_2$CH$_2$), 42.44 (CH$_2$NH), 57.34 (residual OCH$_2$CH$_3$); 168.35 (C(O)); NMR $^{29}$Si with CP-MAS (δ, ppm): −65.8 (T$^3$), −100.5 (Q$^2$), −109 (Q$^4$)

$T^3>Q^2\approx Q^4$; B.E.T.: $S\approx 467$ m$^2$/g; $V_{total\ porous}$=0.4716 cm$^3$/g, no micropores, $\Phi_{average\ of\ pores}$=40 Å.

EXAMPLE 17

Preparation of Hybrid Silica Gel 12e

The quantities of reagents used are the following:

2.3 g of alkoxysilane 5 (4.51 mmoles);
3.75 g of Si(OEt)$_4$ (18.04 mmoles);
27 ml of ethanol;
890 mg H$_2$O (49.4 mmoles);
20 μl of 1M NH$_4$F (20 μmole)

After a week, gelation still has not occurred. 200 μl of 1M NH$_4$F is added. The gelation then occurs within minutes. After treatment, 2.87 g is recovered.

Physical Characteristics of Gel 12e

Yellow powder; IRTF (KBr, cm$^{-1}$): $\nu_{Si-O}$=1062, $\nu_{O-H}$=3401, $\nu_{C=O}$=1668, $\nu_{N-H}$=1558, $\nu_{C-H}$=2941; B.E.T.: $S\approx 436$ m$^2$/g; $V_{total\ porous}$=0.4396 cm$^3$/g, $S_{microporous}$=8 m$^2$/g, $\Phi_{average\ of\ pores}$=40 Å.

EXAMPLE 18

Preparation of Hybrid Silica Gel 12f

The quantities of reagents used are the following:

4.1 g of alkoxysilane 5 (9.6 mmoles);
9.98 g of Si(OEt)$_4$ (48 mmoles)
67 ml of ethanol;
2.25 g H$_2$O (0.125 moles);
67 μl of 1M NH$_4$F (67 μmole)

After eleven days, gelation still has not occurred. 270 μl of 1M NH$_4$F is added. After 14 days, 700 μl of 1M NH$_4$F is again added. The gelation then occurs within hours. After treatment, 5.2 g is recovered.

Physical Characteristics of Gel 12f

Yellow powder; IRTF (KBr, cm$^{-1}$): $\nu_{Si-O}$=1049, $\nu_{O-H}$=3306, $\nu_{C=O}$=1664, $\nu_{N-H}$=1549; NMR $^{29}$Si with CP-MAS (δ, ppm): −67.3 (T$^3$), −102.3 (Q$^3$), −112.7 (Q$^4$) T$^3\approx Q^3\approx Q^4$; B.E.T.: $S\approx 282$ m$^2$/g; $V_{total\ porous}$=0.7988 cm$^3$/g, no micropores, $\Phi_{average\ of\ pores}$=113 Å. Elementary analysis: C$_{2.57}$H$_{4.57}$N$_{0.57}$O$_{4.29}$Si$_2$, %C=18.36, %H=2.74, %N=4.76; %O=40.76, %Si=33.39 for a complete condensation; measured: C$_{2.54}$H$_{6.26}$N$_{0.54}$O$_{5.37}$Si$_2$, %C=16.36, %H=3.38, %N=4.08; %O=46.08, %Si=30.1.

EXAMPLE 19

Preparation of Hybrid Silica Gel 13a

The quantities of reagents used are the following:

740 mg of alkoxysilane 6 (2.4 mmoles);
2.01 g of Si(OEt)$_4$ (9.67 mmoles);
12 ml of ethanol;
440 mg H$_2$O (24.4 mmoles);
24 μl of 1M NH$_4$F (24 μmoles)

In less than 14 hours, a translucent light yellow gel is obtained. The gel is treated as previously described.

Physical Characteristics of Gel 13a

Yellow powder; IRTF (KBr, cm$^{-1}$): $\nu_{Si-O}$=1076, $\nu_{O-H}$=3426, $\nu_{C=O}$=1676, $\nu_{N-H}$=1560, $\nu_{C-H}$=2983; NMR $^{13}$C with CP-MAS (δ, ppm): 9.31 (CH$_2$Si), 17.67 (residual OCH$_2$CH$_3$), 22.75 (CH$_2$CH$_2$CH$_2$), 42.45 (CH$_2$NH), 59.54 (residual OCH$_2$CH$_3$); 168.48 (C(O)); NMR $^{29}$Si with CP-MAS (δ, ppm): −58.7 (T$^2$), −66.1 (T$^3$), −102.9 (Q$^3$), −111.3 (Q$^4$); B.E.T.: $S\approx 197$ m$^2$/g; $V_{total\ porous}$=0.2184 cm$^3$/g, no micropores, $\Phi_{average\ of\ pores}$=44 Å.

EXAMPLE 20

Preparation of Hybrid Silica Gel 14a

The quantities of reagents used are the following:

2.01 g of alkoxysilane 7 (4.78 mmoles);
1.98 g of Si(OEt)$_4$ (9.52 mmoles);
14 ml of ethanol;
464 mg H$_2$O (25.78 mmoles);
13 μl of 1M NH$_4$F (13 μmoles)

In less than 24 hours, a translucent light yellow gel is obtained. The gel is treated as previously described. 1.34 g is recovered.

Physical Characteristics of Gel 14a

Yellow powder; IRTF (KBr, cm$^{-1}$): $\nu_{Si-O}$=1078, $\nu_{O-H}$=3401, $\nu_{C=O}$=1641, $\nu_{C-H}$=2939 and 2979; NMR $^{13}$C with CP-MAS (δ, ppm): 13.58 (NCH$_2$CH$_3$), 18.16 (residual OCH$_2$CH$_3$), 41.95 (NCH$_2$CH$_3$), 58.80 (residual OCH$_2$CH$_3$); 169.09 (C(O)); NMR $^{29}$Si with CP-MAS (δ, ppm): −60.9 (T$^2$), −65.5 (T$^3$), −102.7 (Q$^3$), −110.3 (Q$^4$), Q$^3\approx Q^4>T^3\approx T^2$; B.E.T.: $S\approx 2$ m$^2$/g; Elementary analysis: C$_{4.67}$H$_9$N$_{0.67}$O$_{2.5}$Si, %C=39.33, %H=6.36, %N=6.55; %O=28.06, %Si=19.7 for a complete condensation; measured: C$_{3.18}$H$_{6.93}$N$_{0.41}$O$_{2.71}$Si, %C=31.19, %H=5.71, %N=4.7; %O=35.45, %Si=22.95.

EXAMPLE 21

Preparation of Hybrid Silica Gel 14b

The quantities of reagents used are the following:

1.73 g of alkoxysilane 7 (4.14 mmoles);
2.55 g of Si(OEt)$_4$ (12.3 mmoles);
16 ml of ethanol;
553 mg H$_2$O (30.7 mmoles);
16 μl of 1M NH$_4$F (16 μmoles)

In less than 24 hours, a translucent light yellow gel is obtained. The gel is treated as previously described. 1.69 g is recovered.

Physical Characteristics of Gel 14b

Yellow powder; IRTF (KBr, cm$^{-1}$): $\nu_{Si-O}$=1078, $\nu_{O-H}$=3401, $\nu_{C=O}$=1644, $\nu_{C-H}$=2939 and 2980; NMR $^{13}$C with CP-MAS (δ, ppm): 13.60 (NCH$_2$CH$_3$), 17.87 (residual OCH$_2$CH$_3$), 41.58 (NCH$_2$CH$_3$), 59.14 (residual OCH$_2$CH$_3$); 168.89 (C(O)); NMR $^{29}$Si with CP-MAS (δ, ppm): −58.6 (T$^2$), −65.7 (T$^3$), −103.4 (Q$^3$), −109.9 (Q$^4$), Q$^3\approx Q^4>T^3\approx T^2$; Elementary analysis: C$_{3.5}$H$_{6.75}$N$_{0.5}$O$_{2.38}$Si, %C=34.48, %H=5.58, %N=5.74; %O=31.17, %Si=23.04 for a complete condensation; measured: C$_{3.24}$H$_{6.37}$N$_{0.35}$O$_{2.61}$Si, %C=32.42, %H=5.35, %N=4.08; %O=34.75, %Si=23.40.

EXAMPLE 22

Preparation of Hybrid Silica Gel 14c

The quantities of reagents used are the following:

2.0 g of alkoxysilane 7 (4.79 mmoles);
4.03 g of Si(OEt)$_4$ (19.4 mmoles);

23 ml of ethanol;
795 mg H$_2$O (44.17 mmoles);
23 μl of 1M NH$_4$F (23 μmoles).

In less than 24 hours, a translucent light yellow gel is obtained. The gel is treated as previously described. 2.24 g is recovered.

Physical Characteristics of Gel 14c

Yellow powder; IRTF (KBr, cm$^{-1}$): $v_{Si-O}$=1077, $v_{O-H}$=3430, $v_{C=O}$=1646, $v_{C-H}$=2939 and 2982; NMR $^{29}$Si with CP-MAS (δ, ppm): −58.9 (T$^2$), −64.8 (T$^3$), 102.1 (Q$^3$), −109.4 (Q$^4$), Q$^3$≈Q$^4$>T$^3$≈T$^2$; B.E.T.≈2 m$^2$/g; Elementary analysis: C$_{2.8}$H$_{5.4}$N$_{0.4}$O$_{2.3}$Si, %C=30.7, %H=4.97, %N=5.11; %O=33.59, %Si=25.64 for a complete condensation; measured: C$_{2.26}$H$_{5.23}$N$_{0.29}$O$_{2.72}$Si, %C=25.17, %H=4.88, %N=3.71; %O=40.24, %Si=26, Pt=100 ppm.

EXAMPLE 23

Preparation of Hybrid Silica Gel 14d

The quantities of reagents used are the following:
0.97 g of alkoxysilane 7 (2.32 mmoles);
2.41 g of Si(OEt)$_4$ (11.6 mmoles);
8.5 ml of ethanol;
500 mg H$_2$O (27.8 mmoles);
9 μl of 1M NH$_4$F (9 μmoles)

In less than 24 hours, a translucent light yellow gel is obtained. The gel is treated as previously described.

Physical Characteristics of Gel 14d

Yellow powder; NMR $^{29}$Si with CP-MAS (δ, ppm): −59 (T$^2$), −64.2 (T$^3$), −102.6 (Q$^3$), −108.9 (Q$^4$), Q$^3$≈Q$^4$>>T$^3$≈T$^2$; B.E.T.≈236 m$^2$/g; V$_{total\ porous}$=0.5383 cm$^3$/g, no micropores, Φ$_{average\ of\ pores}$=91 Å. Elementary analysis: C$_{2.33}$H$_{4.5}$N$_{0.33}$O$_{2.25}$Si, %C=27.66, %H=4.48, %N=4.60; %O=35.54, %Si=27.75 for a complete condensation; measured: C$_{2.18}$H$_{4.77}$N$_{0.25}$O$_{2.41}$Si, %C=25.92, %H=4.75, %N=3.4; %O=38.18, %Si=27.66.

In examples 6 to 23, as the presence of the T bands in the NMR $^{29}$Si CP-MAS, the similarity between the NMR $^{13}$C spectra of monomers and materials, and the infrared spectra demonstrate, there is apparently no cleavage of the Si—C bonds during the hydrolysis and condensation process. Also, the relative abundance of T3 and Q4 nuclei in NMR $^{29}$Si CP-MAS is indicative of a network which it not totally, but still highly condensed. Unfortunately, this techniques does not allow for quantitative evaluation of the degree of condensation of the material. A semi-quantitative calculation allows for assigning an order of magnitude of 90% for the condensation of ethoxysilanes.

In operating conditions, the hybrid silica gels synthesised from ureic and pyridinic alkoxysilanes (examples 6 to 12) or monosilylated (noted RSiO$_{1.5}$—nSiO$_2$) propanediamidics (examples 13 to 23) are mesoporous materials for values of n greater than about 4 or 5. The specific surface areas are then greater than 100 m$^2$/g and the distribution in diameter of the pores is relatively homogeneous. Depending on the materials, the average diameter ranges from 30 to 110 Å. The most "organic" materials cannot be considered porous (S<10 m2/g).

The same type of development is observed with silicas synthesised from bissilylated alkoxysilanes. Porosity can be obtained starting from n=1 however (see hybrid gel 12b).

EXAMPLE 24

Preparation of Gel 15a

The same method as in examples 6 to 23 is used to prepare a gel in the absence of the NH$_4$F catalyst, using the following quantities of reagents:

1.11 g of functionalised alkoxysilane 8 (5 mmoles) with the formula:

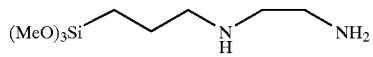

3.8 g of Si(OMe)$_4$ (25 mmoles);
25.5 ml of ethanol;
103.5 mg of H$_2$O (57.5 mmoles).

At the end of 1 minute, an opaque white gel is obtained. The gel is treated as described previously. 2.33 g of gel 15a is obtained.

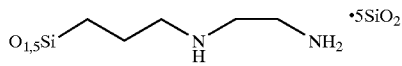

Physical Characteristics of Gel 15a

White powder; IRTF (KBr, cm$^{-1}$): $v_{Si-O}$=1119, $v_{OH}$=3420, $v_{CH}$=2950; NMR $^{13}$C with CP-MAS (δ, ppm): 9.43 (SiCH$_2$), 21.44 (SiCH$_2$CH$_2$), 40.29 (NCH$_2$), 50.64 (residual SiOCH$_3$); NMR $^{29}$Si with CP-MAS (δ, ppm): −66.4 (T$^3$), −101.4 (Q$^3$), −108.4 (Q$^4$), Q$^4$≈Q$^3$>>T$^3$; B.E.T.: S≈269 m$^2$/g; V$_{total\ porous}$=0.9741 cm$^3$/g, S$_{microporous}$=0, Φ$_{average\ of\ pores}$=119.5 Å.

EXAMPLE 25

Preparation of Gel 16a

The same method as in examples 6 to 23 is used to prepare a gel in the absence of the NH$_4$F catalyst, using the following quantities of reagents:

1.06 g of functionalised alkoxysilane 9 (4 mmoles) with the formula:

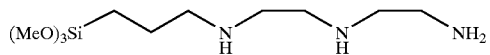

20.5 ml of ethanol;
828 mg of H$_2$O (46 mmoles)

At the end of 1 minute, a white gel is obtained. The gel is treated as described previously. 1.88 g of gel 16a is obtained.

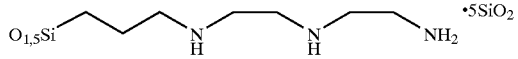

Physical Characteristics of Gel 16a

White powder; IRTF (KBr, cm$^{-1}$): $v_{Si-O}$=1045, $v_{OH}$=3460; NMR $^{29}$Si with CP-MAS (δ, ppm): −63.6 (T$^3$), −99.2 (Q$^3$), −108.3 (Q$^4$), Q$^3$≈Q$^4$>>T$^3$; B.E.T.: S≈109.8 m$^2$/g; V$_{total\ porous}$=0.3897 cm$^3$/g, S$_{microporous}$=0, Φ$_{average\ of\ pores}$=159.5 Å.

Examples 26 to 28 which follow illustrate the use of hybrid gels 12a, 15a and 16a for extraction of actinides and lanthanides from aqueous solutions.

EXAMPLE 26

Extraction of Americium

In this example, gel 15a prepared in example 24 is used to extract americium from a solution of nitric acid containing 13 mg/l of americium and the influence of nitric acid on the extraction in the range of ($H^+$) ion concentrations from 0 to 1 is studied.

This extraction is done by putting 1 ml of the aqueous solution in contact with 70 to 110 mg of the gel for 15 minutes. Then the solution is separated from the gel by centrifuging. The solid-liquid partition coefficient Kd is then determined based on the following formula:

$Kd$=mass of element (in g) per g of gel/mass of element (in g) per ml of solution The solution measurements are done by α counting.

To determine the quantity fixed on the gel, the difference between the quantity of the element in the solution at the start and the quantity of the element in the solution after extraction are taken.

The results obtained are shown in FIG. 1 which represents the change in the partition coefficient Kd of americium as a function of acidity.

It is seen that americium is strongly extracted at low acidity.

EXAMPLE 27

Extraction of Plutonium

In this example, the same method as in example 26 is used to extract plutonium from an aqueous nitric acid solution containing 131 mg/l of Pu, also using gel 15a prepared in example 24.

The results obtained are shown in FIG. 2 which represents the change in the partition coefficient Kd of plutonium as a function of acidity in the range of (H+) ion concentrations from 0 to 6.

The plutonium is measured by α counting.

In this figure, it is seen that the plutonium is bound at high and low acidities, and that it can be eluted from the gel at an acidity of about 0.5 M.

EXAMPLE 28

Extraction of Americium, Neodymium and Plutonium

In this example, the same method as in examples 26 and 27 is used to extract Pu, Am and Nd from an aqueous nitric acid solution containing:

131 mg/l of Pu;

13 mg/l of Am; and 125 mg/l of Nd, but using gel 16a prepared in example 25.

The results obtained are shown in FIG. 3 which represents the change in the partition coefficient Kd of Pu, Am and Nd as a function of acidity in the range of nitric acid concentrations from 0 to 2 mol/l.

Measurements of the quantities of Nd were done with a plasma torch combined with mass spectrometry (ICP-MS).

This figure demonstrates that all of the elements are extracted at low acidity and that it is possible to separate them.

EXAMPLE 29

Extraction of Americium

In this example, the same method as is example 26 is used to extract americium from an aqueous nitric acid solution containing 13 mg/l of Am, but gel 12a prepared in example 13 is used in a quantity of 60 to 80 g, and with a contact time of 120 minutes.

The results obtained are shown in FIG. 4 which represents the change in the partition coefficient Kd of americium as a function of the concentration of nitric acid in the range from 0 to 6 mol/l.

This figure shows that extraction is favoured with a $HNO_3$ concentration of 5M and that elution is possible with a nitric acid solution with an $HNO_3$ concentration below 1 mol/l.

The invention gels are thus very valuable because, depending on the nature of the gel and the acidity of the aqueous solution, they allow for extraction and separation between actinides and lanthanides and then their recuperation by elution in nitric acid solutions.

TABLE 1

| Compound No. | Functionalised alkoxysilane |
|---|---|
| 1 | Ureidopropyltriethoxysilane (Product marketed by Gelest) <br> (EtO)₃Si~~~N(H)—C(=O)—NH₂ |
| 2 | bis [3-(triethoxysilyl)propyl]urea (Product marketed by Gelest) <br> (EtO)₃Si~~~N(H)—C(=O)—N(H)~~~Si(OEt)₃ |
| 3 | 4-[2-(triethoxysilyl)ethyl]pyridine <br> (EtO)₃Si~~~(4-pyridyl) |
| 4 | 2-[2-(triethoxysilyl)ethyl]pyridine <br> (EtO)₃Si~~~(2-pyridyl) |
| 5 | N,N'-bis(triethoxysilylpropyl)-1,3-propanediamide <br> (EtO)₃Si~~~N(H)—C(=O)—CH₂—C(=O)—N(H)~~~Si(OEt)₃ |
| 6 | N-triethoxysilylpropyl-1,3 propanediamide <br> (EtO)₃Si~~~N(H)—C(=O)—CH₂—C(=O)—NH₂ |
| 7 | N,N,N',N'-tetraethyl-2-triethoxysilylpropyl-1,3-propanediamide <br> (EtO)₃Si~~~CH[C(=O)NEt₂]₂ |

TABLE 1-continued

| Compound No. | Functionalised alkoxysilane |
|---|---|
| 8 | N-trimethoxysilylpropyl-1,3 ethylenediamine<br>(MeO)₃Si~~~N(H)~~~NH₂ |
| 9 | N-trimethoxysilylpropyl-N' aminoethyl-ethylenediamine<br>(MeO)₃Si~~~N(H)~~~N(H)~~~NH₂ |

TABLE 2

| Example | Functionalised alkoxysilane | Si(OEt)4 (n) | Ref. Gel |
|---|---|---|---|
| 6 | ureidopropyltriethoxysilane 1 | 0 | 8a |
| 7 | ureidopropyltriethoxysilane 1 | 2 | 8b |
| 8 | ureidopropyltriethoxysilane 1 | 5 | 8c |
| 9 | Bis[3-(triethoxysilyl)ethyl]urea 2 | 0 | 9a |
| 10 | Bis[3-(triethoxysilyl)ethyl]urea 2 | 5 | 9b |
| 11 | 4-[2-(triethoxysilyl)ethyl]pyridine 3 | 4 | 10a |
| 12 | 2-[2-(triethoxysilyl)ethyl]pyridine 4 | 4 | 11a |
| 13 | N,N'-di(triethoxysilylpropyl)-1,3 propanediamide 5 | 0 | 12a |
| 14 | N,N'-di(triethoxysilylpropyl)-1,3 propanediamide 5 | 1 | 12b |
| 15 | N,N'-di(triethoxysilylpropyl)-1,3 propanediamide 5 | 2 | 12c |
| 16 | N,N'-di(triethoxysilylpropyl)-1,3 propanediamide 5 | 3 | 12d |
| 17 | N,N'-di(triethoxysilylpropyl)-1,3 propanediamide 5 | 4 | 12e |
| 18 | N,N'-di(triethoxysilylpropyl)-1,3 propanediamide 5 | 5 | 12f |
| 19 | N,-triethoxysilylpropyl-1,3 propanediamide 6 | 4 | 13a |
| 20 | N,N,N',N'-tetraethyl-2-propyltriethoxysilyl-1,3 propanediamide 7 | 2 | 14a |
| 21 | N,N,N',N'-tetraethyl-2-propyltriethoxysilyl-1,3 propanediamide 7 | 3 | 14b |
| 22 | N,N,N',N'-tetraethyl-2-propyltriethoxysilyl-1,3 propanediamide 7 | 4 | 14c |
| 23 | N,N,N',N'-tetraethyl-2-propyltriethoxysilyl-1,3 propanediamide 7 | 5 | 14d |
| 24 | N-trimethoxysilylpropyl-ethylenediamine 8 | 5 | 15a |
| 25 | N-trimethoxysilylpropyl-N'-aminoethyl-ethylenediamine 9 | 5 | 16a |

Documents Cited

1. U.S. Pat. No. 4,203,952
2. Journal of Radioanalytical and Nuclear Chemistry, Articles, vol. 141, No. 1, 1990, p. 107–115.

What is claimed is:

1. A process for the extraction of ions selected from the group consisting of the actinide and lanthanide ions, said ions being present in an aqueous solution, and said process comprising the steps of:
   a) putting said aqueous solution into contact with an organic-inorganic hybrid gel;
   b) separating said organic-inorganic hybrid gel from said aqueous solution;
   wherein said organic-inorganic hybrid gel has been previously obtained by polycondensing, in a solvent comprising water, at least one functionalized silicon alkoxide with a metallic alkoxide, wherein the functionalized silicon alkoxide is selected from the group consisting of

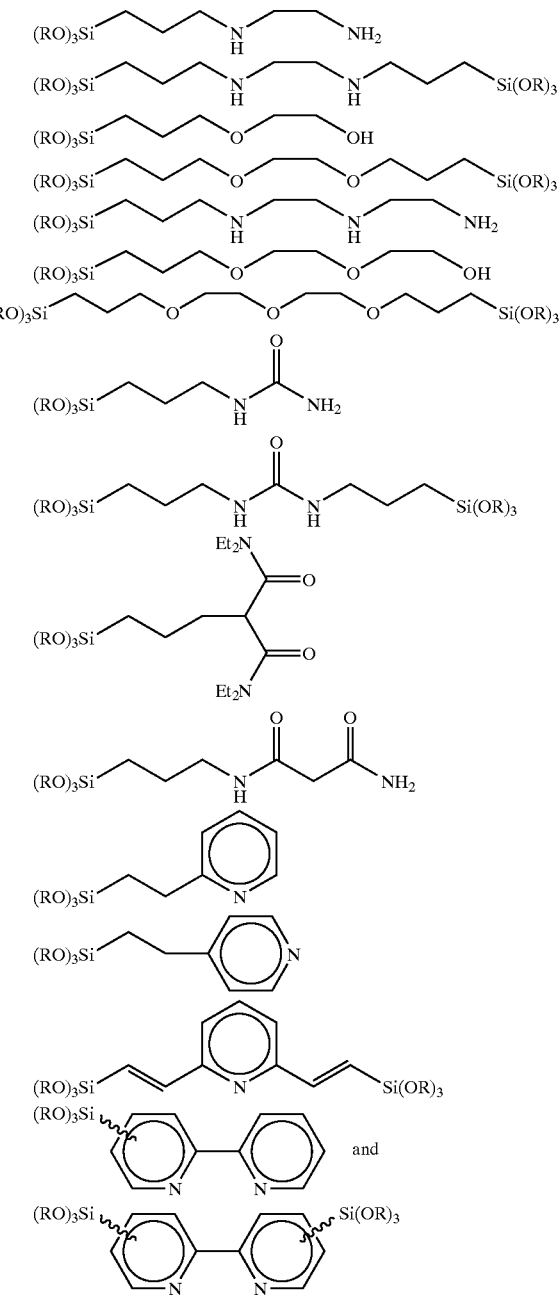

in which R is an organic group.

2. The process of claim 1, wherein said metallic alkoxide is of the formula:

$$M(OR^2)_m$$

wherein M is selected from Si, Ti, Zr, and Al, $R^2$ is an organic group; m=4 when M is Si, Ti, or Zr; and m=3 when M is Al.

3. The process of claim 2, wherein M is Si.

4. The process of claim 1, wherein said metallic alkoxide is of the formula:

$$(R_3O)_b M—X—M—(OR_3)_b$$

wherein M represents Si, Ti, Zr or Al, $R_3$ is an organic group, X represents a non-complexing organic group, and b=3 when M represents Si, Ti or Zr or b=2 when M represents Al.

5. The process of claim 1, wherein the solvent further comprises ethanol and ammonium fluoride.

6. The process of claim 1, wherein the functionalized silicon alkoxide is selected from the group consisting of:

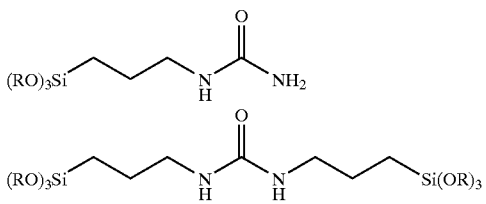

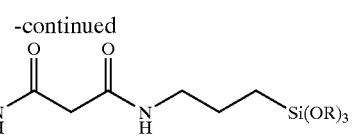

7. The process of claim 1, wherein said organic-inorganic hybrid gel is obtained by polycondensing the functionalized silicon alkoxide and the metallic oxide with 1 to 5 equivalents of tetraethoxysilane.

8. The process of claim 1, wherein said organic-inorganic hybrid gel is previously obtained by polycondensing the functionalized silicon alkoxide and the metallic alkoxide with at least one of the ions to be extracted, followed by a step of eliminating said ions by washing, wherein the gel thereby obtains an imprint effect of the ions that improves the selectivity of the organic-inorganic hybrid gel for the extraction of the ions from the aqueous solution.

9. The process of claim 1, wherein said organic-inorganic hybrid gel is in the form of a powder.

10. The process of claim 1, wherein said organic-inorganic hybrid gel is in the form of a membrane.

\* \* \* \* \*